United States Patent
Leifer et al.

(10) Patent No.: US 6,517,068 B1
(45) Date of Patent: *Feb. 11, 2003

(54) LIGHT APPARATUS FOR ILLUMINATING A COMPACT COMPUTER VIDEO SCREEN

(75) Inventors: Robert Leifer, Dix Hills, NY (US); Gabe Neiser, Rego Park, NY (US)

(73) Assignee: Arista Interactive LLC, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,245

(22) Filed: May 9, 2000

(51) Int. Cl.⁷ .................................................. A63F 13/00
(52) U.S. Cl. ............................ 273/148 R; 273/148 B; 463/47; 362/109
(58) Field of Search ................. 463/44–47; 273/143 R; 362/84–86, 89, 317, 341, 343

(56) References Cited

U.S. PATENT DOCUMENTS

| | | | |
|---|---|---|---|
| 4,589,659 A | * 5/1986 | Yokoi et al. | 345/7 |
| 5,091,832 A | 2/1992 | Tortola et al. | |
| 5,115,383 A | * 5/1992 | Lee | 273/148 R |
| 5,117,339 A | 5/1992 | Tortola et al. | |
| 5,119,239 A | 6/1992 | Iaquinto et al. | |
| 5,130,907 A | 7/1992 | Tortola et al. | |
| 5,165,779 A | 11/1992 | Tortola et al. | |
| 5,325,280 A | 6/1994 | Tortola et al. | |
| 5,795,227 A | * 8/1998 | Raviv et al. | 463/31 |
| 5,897,201 A | * 4/1999 | Simon | 362/147 |
| 6,026,602 A | * 2/2000 | Grondal et al. | 362/800 |
| 6,078,421 A | * 6/2000 | Davey et al. | 349/64 |
| 6,186,636 B1 | 2/2001 | Naghi et al. | |
| 6,264,342 B1 | * 7/2001 | von Hagen | 362/138 |
| 6,280,048 B1 | * 8/2001 | Luquire | 362/109 |

\* cited by examiner

Primary Examiner—Valencia Martin-Wallace
Assistant Examiner—John M Hotaling, II
(74) Attorney, Agent, or Firm—Keusey, Tutunjian & Bitetto, P.C.

(57) ABSTRACT

An improved lighting apparatus for hand held video games utilizes a directional light source and a curved reflective surface disposed opposite the directional source in a frame positioned proximate to the display screen of the hand held device. The use of a directional light source and the curved reflective material provides an increased and more diffused lighting effect while eliminating the otherwise experienced hot spots or dark spots common in prior art light assemblies.

29 Claims, 4 Drawing Sheets

LIGHT APPARATUS FOR ILLUMINATING A COMPACT COMPUTER VIDEO SCREEN

BACKGROUND OF THE INVENTION

1. Field of the Invention

The present invention relates to hand held video games, and more particularly, to a releasably attachable light assembly for the hand held video game for enabling game playing in low light conditions.

2. Description of the Related Art

Compact computers and video game devices having video viewing screens are becoming more and more popular and typically comprise hand-held portable, battery-operated devices. The viewing screen is typically a liquid crystal display (LCD) that is generally flat and displays information and or provides the screen for playing video games. Such compact computers and video games may include, but are not limited to: calculators, computer video games, lap top computers, and other computers where a variety of software is employed. In particular, compact video games, such as the compact video game systems known as GAME BOY™, GAME BOY POCKET™ and GAME BOY COLOR™ (Trademarks of Nintendo of America), are completely self-sustained video game systems which may be operated by interchangeably employing a collection from a library of software game packs. These Nintendo video game systems provide a compact, self-contained, battery-operated, portable hand-held computer with a cross key joy stick (directional-pad or D-pad) to operate the game start and select buttons, action buttons and an LCD-type screen, together with volume controls so as to display and enable the user to display images and play games.

While video display screens are employed and typically include a flat LCD-type screen, such LCD-type display screens are often difficult to observe by the user in partial or low light conditions, such as, for example, automobiles, planes, trains, buses, and the like due to the lack of illumination on the LCD screen to permit suitable contrast during use.

U.S. Pat. Nos. 5,091,832 and 5,325,280 show a light apparatus for use with compact computer screens. As shown and described, the body includes an open video space designed to be the same size as the LCD video screen of the compact computer apparatus. The body includes a pair of sloped or angled white colored side panels and a top and bottom side panel and the white or light colored extending directly generally perpendicular to the video screen rather than sloped as illustrated for the side panels. The top side panel is integral with and extends from the bottom molded section of the body when the body sections are matingly engaged to form the body, the top panel with the panels on the top section then form a rectangular, open video viewing space of the apparatus.

The light apparatus includes a pair of light bulbs placed on either side of sloping panels and which side panels also include a short, solid, upward extending light shield so as to prevent the direct glare of the light bulbs onto the LCD screen and to provide for indirect lighting through reflection on the light-colored side panels onto the LCD viewing screen.

U.S. Pat. Nos. 5,117,339 and 5,165,779 disclose combined light and magnifier devices for hand-held computers with video screens. Each of these patents show a battery operated light assembly that is mounted to a separate assembly mounted adjacent the view screen and spaced from the magnifier lens. The devices shown in these patents are adapted to provide a screen magnifier while also providing additional light to the screen for playing in low light conditions.

Unfortunately, the use of an LCD screen in these hand-held video game devices makes the illumination of the same difficult. The primary reason for this difficulty is due to the fact that the plastic cover to the actual LCD screen is generally of a high-gloss finish, and as such has a tendency to reflect light. This reflection of light primarily occurs when the light shines substantially directly onto the screen, and thus, the high-gloss screen cover prevents the light from penetrating the cover and thereby illuminating the LCD screen.

In all of the aforementioned patents, the lighting assembly utilizes incandescent type bulbs which are oppositely positioned within the solid frame surrounding the viewing screen, The use of white or light colored frame sides is implemented in an effort to diffuse the light before projected onto the screen, however, neither the white or light colored sides of the frame prevent spotting or "hot spots" caused by the illumination of the incandescent bulb immediately adjacent the viewing screen. As such, the incandescent bulb, in the area of disposition, causes a glare spot or "hot spot" on the high-gloss cover to the actual LCD display screen. Thus, the user's view is obstructed and not increased in these hot spot areas. Furthermore, dark spots are created on the screen where the additional light is not effectively distributed across the screen. In view of these drawbacks of the prior art patents, it would be desirable to provide a lighting assembly for a hand-held computer gaming device that does not have any screen "hot spots" or dark spots, and actually works to increase the viewing of the display screen.

SUMMARY OF THE INVENTION

It is therefore an object of the invention to provide an improved lighting assembly for hand-held video games that does not cause "hot spot" or other glaring effects from the use of light source to illuminate the LCD display.

It is yet another object of the invention to provide an improved lighting assembly for hand-held video games that effectively utilizes reflection techniques to efficiently illuminate the LCD display screen of the game device.

This and other objects are achieved in accordance with an embodiment of the present invention in which an improved light assembly for use in enhancing the view of a compact computer video screen comprises: a frame opening corresponding in size to a size of the compact computer video screen; a directional light source disposed in a side of the frame opening for projecting a substantially collimated light beam toward an opposing side of said frame opening, said directional light source being recessed within said frame side so as to not extend into said frame opening; and a curved reflective surface disposed entirely across said opposing side of said frame opening and adapted to reflect the received collimated light beam in a substantially evenly diffused configuration toward the video screen, wherein said curved reflective surface is recessed into said frame so as to not extend into said frame opening.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar elements throughout the several views.

DETAILED DESCRIPTION OF PREFERRED EMBODIMENTS

Figure 1:
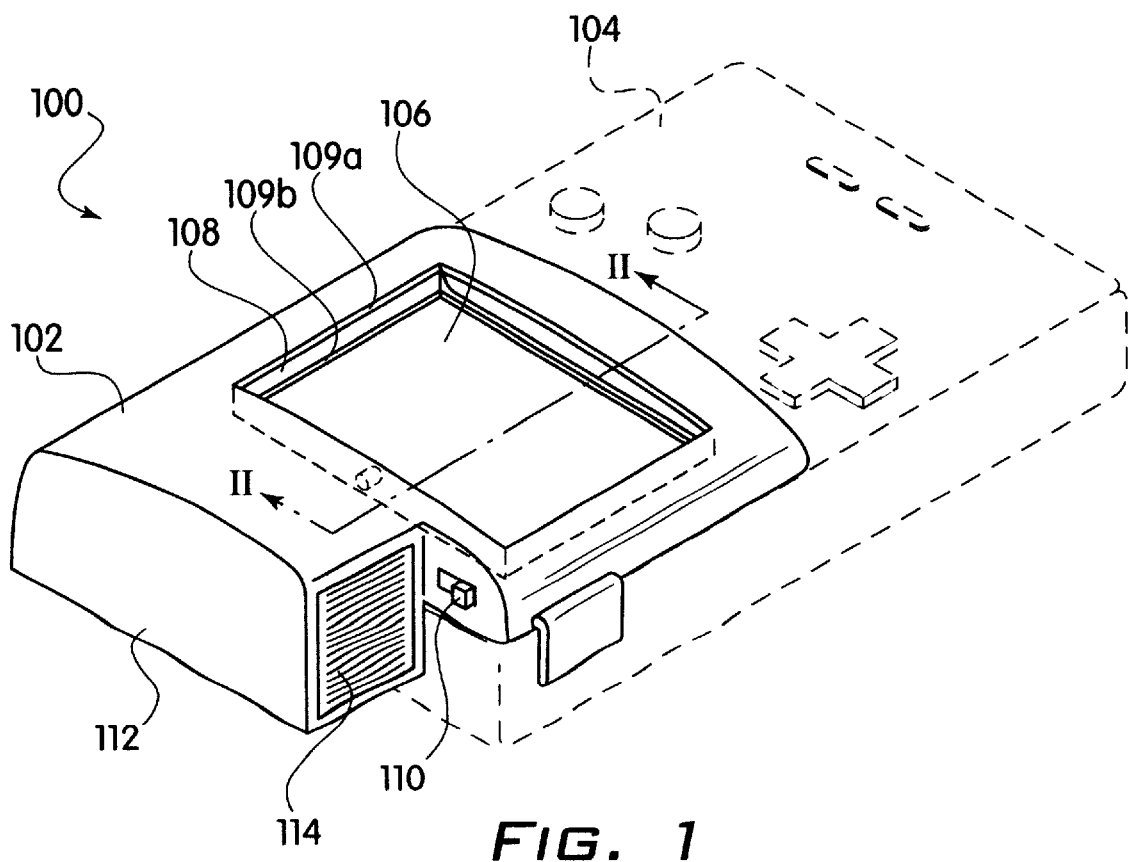
FIG. 1 is a perspective view of the improved lighting assembly according to an embodiment of the invention.

Referring to FIG. 1, there is shown the improved light assembly system 100 according to a first embodiment of the invention. Light assembly 102 is slidably disposed on the hand-held video game device 104 as shown and described in U.S. Pat. Nos. 5,091,832 and 5,325,280, both of which are incorporated herein by reference. Light assembly 102 includes an upper and lower frame opening 109a and 109b, respectively, that form an overall frame 108 that is substantially dimensioned according to the dimensions of the underlying display screen 106 on game device 104.

Figure 2:
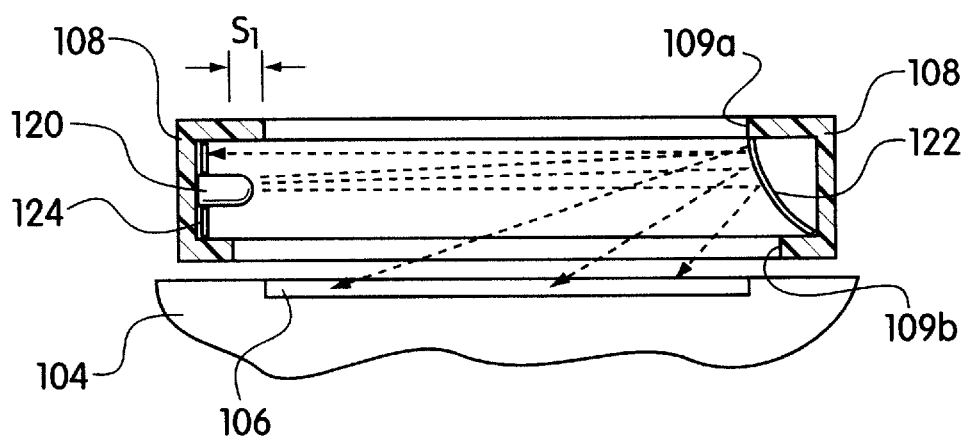
FIG. 2 is a cross-sectional view of the improved lighting assembly taken along lines II—II of FIG. 1.

Light assembly 102 includes a power on/off switch 110, a battery compartment 112 and an access panel 114 for allowing the replacement of the enclosed batteries (not shown). In subsequent embodiments, the use of an on/off switch and battery compartment are eliminated. FIG. 2 shows a cross-section of the frame 108 taken along lines II—II in FIG. 1. As shown, frame 108 includes has a substantially C-shaped cross-section and includes a light source 120 recessed into the frame and positioned so as to not protrude into the viewing area formed by upper and lower openings 109a and 109b. According to a preferred embodiment, upper frame opening 109a is smaller than the lower frame opening 109b by an offset distance $S_1$. This offset between the upper frame opening 109a and lower frame opening 109b prevents light from escaping upward beyond the upper frame opening 109a, regardless of the light source implemented. The different size frame openings are especially effective when incandescent light sources are used as light source 120. By increasing the opening size of the lower frame opening 109b, the light reflected by curved reflective surface 122 that is already is angled toward the lower frame opening now has an opening of increased size through which the light is received onto the video screen 106. The video screen 106 may be a liquid crystal display, a plasma display, a mini CRT, or any other type of video screen. Those of skill in the art will recognize that any other type of video screen may be used in the game device 104 without departing from the spirit of the invention.

The light source 120 is preferably a directional light source such as a directional light emitting diode (LED) and/or an incandescent light bulb having a collimating lens for directing the output light toward the opposing side of the frame 108 with as little dispersion prior to contacting the opposing side of the frame 108.

Opposite light source 120 is a curved reflective surface 122 adapted to reflect the received light back toward light source 120 and reflective surface 124 and down toward screen 106. The angle of curvature is preferably within a range of 45–90 degrees with respect to the received collimated light beam. For example, curved reflective surface 122 is a partial or approximately ⅛ tubular section as shown. The top portion near upper frame opening 109a is angled at approximately 90 degrees with respect to the light beam, effectively reflecting light back toward light source 120 and reflective surface 124. The bottom portion of surface 122 near lower frame opening 109b is angled at approximately 45° with respect to the light beam, thereby reflecting light directly downward toward screen 106. Between the top and bottom portions, curved reflective surface 122 curves continuously between the 90° and the 45° angled portions. This variably curving central section of surface 122 reflects light onto screen 106 at a correspondingly broad range of angles thereby eliminating glare from almost any viewing angle. In this manner, the received collimated light beam is variably and angularly directed toward the display screen 106 of the game device.

Figure 3A:
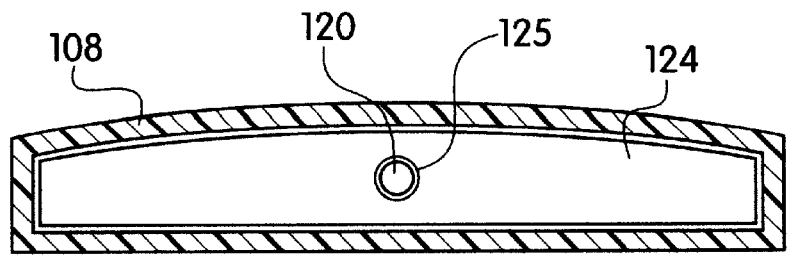
FIG. 3a is a sectional view of the improved lighting assembly according to a first embodiment of the invention.

In addition, a reflective surface 124 is disposed entirely around directional light source 120 and extends across the entire respective internal side of frame 108. FIG. 3a shows the disposition of reflective material 124 along the entire inside surface of frame 108 within which light source 120 is disposed. A hole 125 in reflective material 124 is provided to accommodate light source 120.

The reflective material implemented for materials 122 and 124 is preferably a mylar reflective material, but may also be any suitable known reflective material, and must be at least capable of being curved as depicted with reflective material 122.

As diagrammatically shown in FIG. 2, when directional light source 120 is illuminated, it projects a substantially collimated beam of light toward reflective surface 122. The collimation of light source 120 is provided by the previously mentioned directional LED, or may be provided through the use of an appropriate lens. An attribute of the light source 120 is that the light emanating therefrom does not disperse or come into contact with display screen 106 prior to being received by the opposing reflective surface 122.

Due to the curvature of reflective surface 122, some of the received light from light source 120 is reflected downward toward display screen 106 at various different angles, while other portions of the received light are reflected back toward the surface on which light source 120 is disposed. Thus, the additional reflective material 124 positioned around light source 120, shown in FIG. 3a, serves to further reflect light back toward the curved reflective surface 122. In this manner, the directional light originating from light source 120 is reflected at least once and potentially several times before the light is ultimately directed toward the display screen 106. Thus, when the light reaches the display screen 106, it is substantially diffused and thereby effectively illuminates display screen 106 more evenly and without any possibility of hot spots or glare spots as experienced with the lights of the prior art.

Figure 3B:
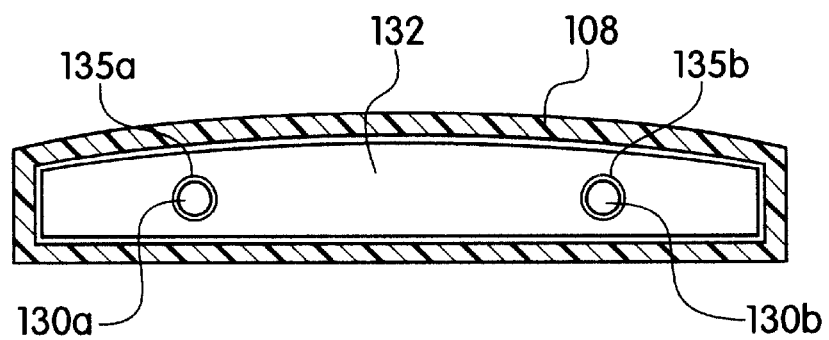
FIG. 3b is a sectional view of the improved lighting assembly according to a second embodiment of the invention.

FIG. 3b shows an alternative embodiment of the present invention wherein two light sources 130a and 130b are used, and two corresponding holes 135a and 135b are disposed in the reflective material 132 surrounding these light sources.

Figure 4:
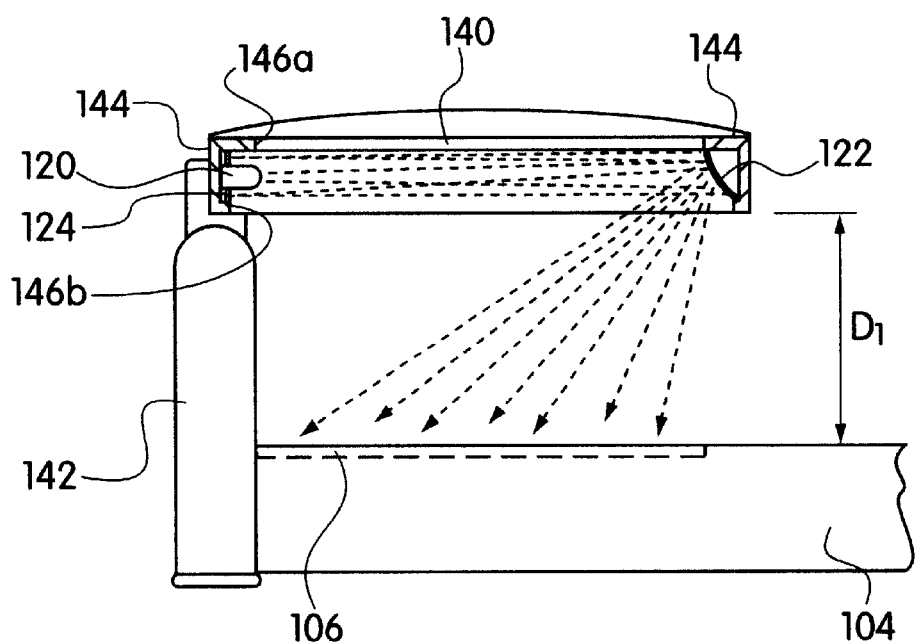
FIG. 4 is a side view of the improved lighting assembly as implemented into a combined light and magnifier or the hand held video game device according to a third embodiment of the invention.

FIG. 4 shows another embodiment of the lighting system of the present invention as incorporated into a display screen magnifier. Magnifiers of this type are disclosed in U.S. Pat. Nos. 5,117,339, 5,119,239 and 5,165,779, all of which are incorporated herein by reference. The magnifier 142 connects to the game device 104 such that a frame 144 is disposed a predetermined distance $D_1$ from the upper surface of the game device 104. Generally, a magnifying lens 140 is disposed within frame 144 so as to provide a magnified view of display screen 106 for the user. Frame 144 is made up of an upper frame opening 146a and lower frame opening 146b. As described with respect to the embodiment shown in FIG. 2, upper frame opening 146a is slightly smaller than lower frame opening 146b and thereby acts to block light from dispersing upward and out of the frame opening, while the larger lower frame opening 146b provides more area for the light to disperse and be reflected downward. As shown, the lighting system of the present invention is integrated into frame 144. Thus, when directional light source 120 is illuminated, the light beams are directed toward reflective surface 122, and are ultimately reflected downward by said reflective surface. As discussed previously, an additional surface of reflective material 124 is positioned around light source 120 and provides an additional surface from which light may reflect.

The use of the directional light source 120 in combination with the curved reflective surface 122 and oppositely positioned reflective surface 124 causes the light emanating from light source 120 to be reflected and re-reflected before ultimately being directed toward display screen 106. It is this reflection and re-reflection that results in a more diffused light being imposed on display screen 106. The diffused light is more evenly dispersed across the screen and does not cause hot spots, glare spots or dark spots on the high-gloss cover of the display screen 106.

Figure 5:
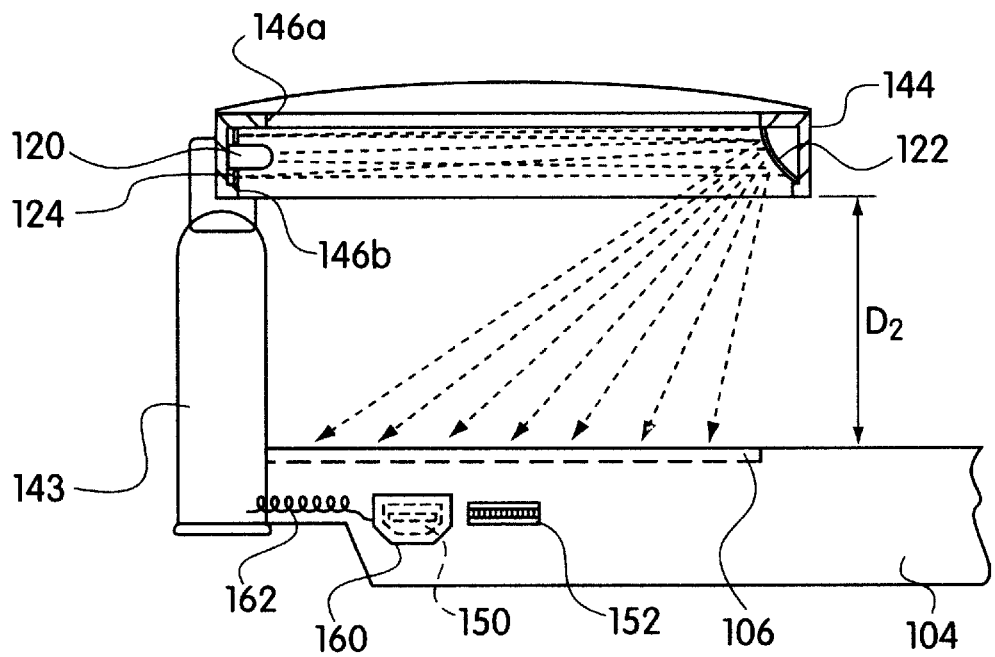
FIG. 5 is a side partial cross sectional view of the improved lighting assembly according to a fourth embodiment of the invention.

FIG. 5 shows another embodiment of the present invention in which a light assembly 143 does not contain a power source, but rather includes a plug 160 with a wires 162 connecting the plug to the lighting assembly 143. In addition, the lighting assembly 143 is raised from game device 104 by a distance $D_2$ that is either predetermined or user settable. There is no magnifying lens in either frame opening 146a and 146b, and thus the distance $D_2$ provides a wider dispersion angle for the light generated by the lighting assembly in reaching the display screen 106. The game device 104 includes a volume control dial 152 and an external link port 150 that can be used to connect the game device to other game devices for head to head game playing. Link port 150 can also be used to provide power to the lighting assembly 143 by inserting plug 160. In this manner, lighting assembly 143 can be powered using the battery power contained within game device 104 and does not require its own battery supply or on/off switch. Thus, when the game device is powered on, the power supply to link port 150 is automatically provided, thereby automatically powering the lighting assembly 143.

Figure 6:
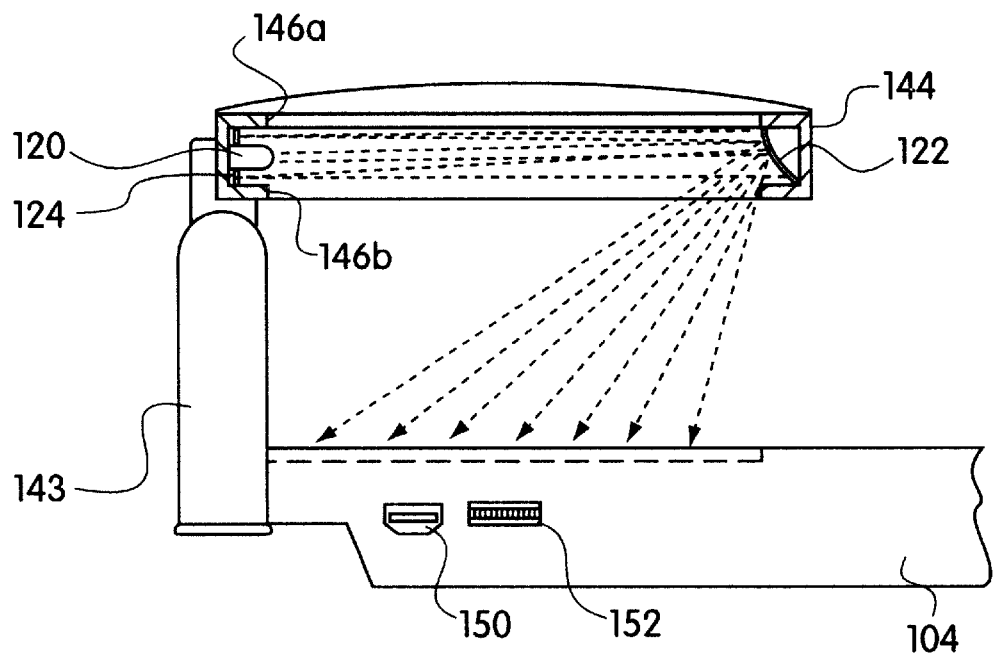
FIG. 6 is a side partial cross sectional view of the improved lighting assembly according to a fifth embodiment of the invention.

FIG. 6 shows another embodiment of lighting assembly 143 where the upper frame opening 164a and lower frame opening 164b are the same size. In this embodiment, it is not necessary for light source 120 and curved reflective surface 122 to be completely recessed into the frame 144. As such, light source 120 and curved reflective surface 122 may extend into the opening formed by upper and lower frame openings 164a and 164b, respectively.

Figure 7:
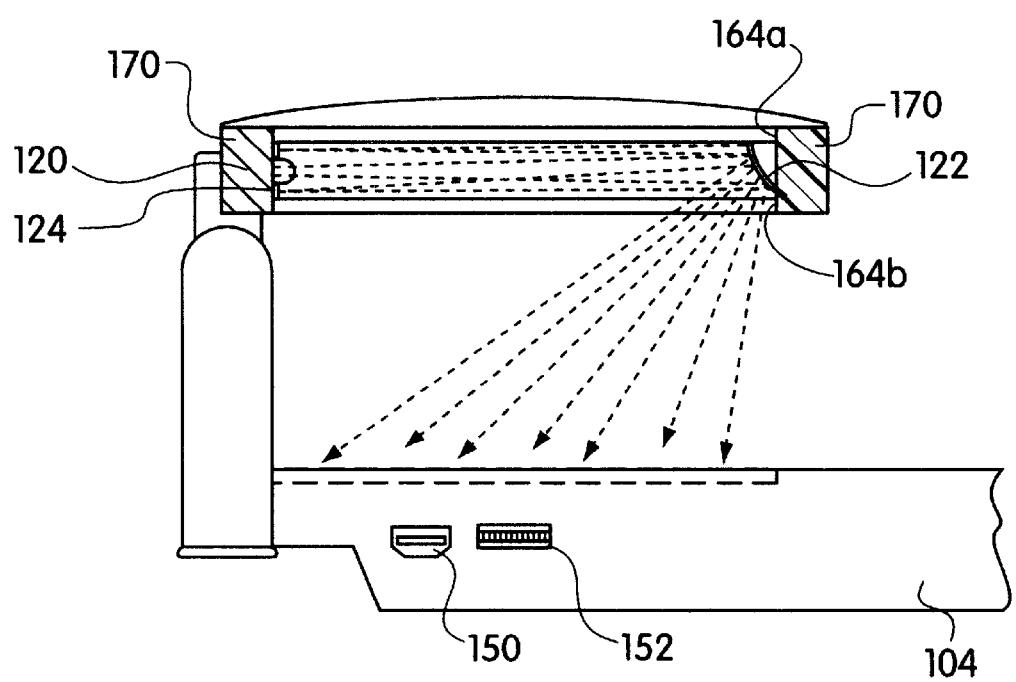
FIG. 7 is a side partial cross sectional view of the improved lighting assembly according a sixth embodiment of the invention.

FIG. 7 shows yet another embodiment of lighting assembly 142 wherein frame 170 does not have a C-shaped cross-section. Thus, light source 120 and curved reflective surface 122 are disposed between upper frame opening 164a and lower frame opening 164b without necessarily being recessed into the respective side of the frame 144.

While there have been shown and described and pointed out fundamental novel features of the invention as applied to preferred embodiments thereof, it will be understood that various omissions, substitutions, changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An improved light assembly for use in enhancing the view of a video screen of a compact computer device, the compact computer device having a power supply, an on/off power switch, and a link port adapted to connect the compact computer device to another compact computer device, the improved lighting assembly comprising:
    a frame having a frame opening adapted to be positioned over the computer video screen;
    a directional light source disposed at a side of said frame for projecting light towards an opposing side of said frame; and
    a curved reflective surface disposed opposite said directional light source across said frame opening at said opposing side of said frame for reflecting light received from said directional light source in a substantially diffused manner across the video screen.

2. The improved light assembly according to claim 1, further comprising an additional reflective surface disposed opposite said curved reflective surface across said frame opening, said additional reflective surface further reflecting light reflected from said curved reflective surface back toward said curved reflective surface.

3. The improved light assembly according to claim 1, further comprising power supply means for supplying the light source with electrical current.

4. The improved light assembly according to claim 3, wherein said power supply means comprises a plug electrically connected to the light assembly and adapted to be releasably connected to the link port of the device, said plug connecting to electrical contacts within said link port to obtain electrical current from the computer device for illuminating said light source.

5. The improved light assembly according to claim 3, wherein said power supply means comprises:
    a battery compartment;
    a battery power source;
    a power switch; and
    electrical circuitry adapted to connect said battery power source to said light source in response to a position of said power switch.

6. The improved light assembly according to claim 1, wherein said directional light source comprises an incandescent light bulb with a lens adapted to collimate light emitted therefrom and direct light toward said curved reflective surface.

7. The improved light assembly of claim 1, wherein said directional light source comprises a directional light emitting diode (LED).

8. An improved light assembly for use in enhancing the view of a video screen of a compact computer device, the compact computer device having a power supply, an on/off power switch, and a link port adapted to connect the compact computer device to another compact computer device, the improved lighting assembly comprising:

a frame opening adapted to be positioned over the computer video screen;

a directional light source disposed within a side of said frame opening for projecting a substantially collimated light beam toward an opposing side of said frame opening; and a curved reflective surface disposed entirely across said opposing side of said frame opening and adapted to reflect the received collimated light beam in a substantially evenly diffused manner across the video screen.

9. The improved light assembly according to claim 8, further comprising an additional reflective surface disposed on said side of said directional light source and extending completely around said directional light source, said additional reflective surface further reflecting light reflected from said curved reflective surface back toward said curved reflective surface.

10. The improved light assembly according to claim 8, wherein said directional light source and said curved reflective surface are recessed within the respective opposing frame sides so as to not extend into said frame opening.

11. The improved light assembly according to claim 8, further comprising power supply means for selectively supplying said directional light source with electrical current.

12. The improved light assembly according to claim 11, wherein said power supply means comprises a plug electrically connected to the light assembly and adapted to be releasably connected to the link port of the device, said plug connecting to electrical contacts within said link port to obtain electrical current from the computer device for illuminating said light source.

13. The improved light assembly according to claim 8, wherein said directional light source comprises a directional light emitting diode (LED).

14. The improved light assembly according to claim 8, wherein said directional light source comprises an incandescent light bulb with a lens adapted to collimate light emitted therefrom and direct it toward said curved reflective surface.

15. The improved light assembly according to claim 8, wherein said curved reflective comprises an arc having angle of curvature within a range of 45–90 degrees with respect to the received collimated light beam such that the collimated light beam is angularly reflected toward said video screen and said additional reflective surface.

16. The improved light assembly according to claim 8, further comprising:

a battery power source;

a power switch; and electrical circuitry adapted to connect said battery power source to said light source in response to a position of said power switch.

17. An improved light assembly for use in enhancing the view of a compact computer video screen, the light assembly having a power supply and a power on/off switch, the improved light assembly comprising:

a frame opening formed from an upper frame opening and a lower frame opening, said upper frame opening being smaller than said lower frame opening, said frame opening being positionable over and spaced from the computer video screen; and a light source disposed in a side of the frame opening between said upper frame opening and said lower frame opening for projecting light toward an opposing side of said frame opening.

18. The improved light assembly according to claim 17, further comprising:

a curved reflective surface disposed entirely across said opposing side of said frame opening and adapted to reflect the received collimated light beam in a substantially evenly diffused configuration toward the video screen, wherein said curved reflective surface is recessed into said frame so as to not extend into said frame opening; and wherein said light source comprises a directional light source adapted to emit a substantially collimated beam of light toward said curved reflective surface, said directional light source being recessed within said frame between said upper frame opening and said lower frame opening side so as to not be visible through said upper frame opening.

19. The improved lighting assembly according to claim 18, further comprising an additional reflective surface disposed on said side of said directional light source and extending completely around said directional light source, said additional reflective surface further reflecting light received from said curved reflective surface back toward said curved reflective.

20. The improved lighting assembly according to claim 19, wherein said directional light source comprises a directional light emitting diode (LED).

21. The improved lighting assembly according to claim 19, wherein said curved reflective surface comprises an arc having an angle of curvature within a range of 45–90 degrees with respect to the received collimated light beam such that the collimated light beam is angularly reflected toward said video screen.

22. The improved light assembly according to claim 19, wherein said frame opening comprises a substantially C-shaped cross section with said upper frame opening forming a top part of said C-shaped cross section and extending further into said frame opening than said lower frame opening forming a bottom part of said C-shaped cross section.

23. The improved light assembly according to claim 17, wherein said light source comprises an incandescent light bulb.

24. An improved light assembly for use in combination with a hand held video game device having a compact display screen, the light assembly having a power supply and a power on/off switch, the improved light assembly comprising:

a frame opening formed from an upper frame opening and a lower frame opening, said upper frame opening being smaller than said lower frame opening, said frame opening being positionable over the computer video screen;

a directional light source disposed in a side of the frame opening for projecting a substantially collimated light beam toward an opposing side of said frame opening, said directional light source being recessed within said frame between said upper frame opening and said lower frame opening so as to not be visible through said upper frame opening; and a curved reflective surface disposed entirely across said opposing side of said frame opening and adapted to reflect the received collimated light beam in a substantially evenly diffused configuration toward the video screen, wherein said curved reflective surface is recessed into said frame so as to not extend into said frame opening.

25. The improved light assembly according to claim 24, further comprising an additional reflective surface disposed on said side of said directional light source and extending completely around said directional light source, said additional reflective surface further reflecting light reflected from said curved reflective surface back toward said curved reflective surface.

26. The improved light assembly according to claim 24, wherein said directional light source comprises a directional light emitting diode (LED).

27. The improved light assembly according to claim 24, wherein said directional light source comprises an incandescent light bulb with a lens adapted to collimate light emitted therefrom and direct it toward said curved reflective surface.

28. The improved light assembly according to claim 24, wherein said curved reflective comprises an arc having angle of curvature within a range of 45–90 degrees with respect to the received collimated light beam such that the collimated light beam is angularly reflected toward said video screen and said additional reflective surface.

29. The improved light assembly according to claim 24, wherein said frame opening comprises a substantially C-shaped cross section with said upper frame opening forming a top part of said C-shaped cross section and extending further into said frame opening than said lower frame opening forming a bottom part of said C-shaped cross section.

* * * * *